United States Patent [19]

Lindbergh

[11] 4,198,925
[45] Apr. 22, 1980

[54] GRADING SMALL LIVE FISH UNDERWATER

[75] Inventor: Jon M. Lindbergh, Bainbridge Island, Wash.

[73] Assignee: Domsea Farms, Inc., New York, N.Y.

[21] Appl. No.: 934,963

[22] Filed: Aug. 18, 1978

[51] Int. Cl.² ............................................. A01K 61/00
[52] U.S. Cl. ........................................... 119/3; 43/100
[58] Field of Search ............... 119/3; 43/100; 209/675

[56] References Cited

U.S. PATENT DOCUMENTS

| | | | |
|---|---|---|---|
| 1,610,350 | 12/1926 | Anderson et al. | 209/394 |
| 2,396,305 | 3/1946 | Toft | 214/14 |
| 2,643,481 | 6/1953 | Ederer | 43/105 |
| 2,690,158 | 9/1954 | Petty | 119/3 |
| 3,096,600 | 7/1963 | Gwyther | 43/100 |
| 3,204,605 | 9/1965 | Vroman | 119/3 |
| 3,833,119 | 9/1974 | Brown | 209/675 |
| 3,951,104 | 4/1976 | Neff | 119/3 |
| 4,086,875 | 5/1978 | Lindbergh | 119/3 |

FOREIGN PATENT DOCUMENTS 1436125  5/1976  United Kingdom ..................... 119/3

*Primary Examiner*—Louis G. Mancene
*Assistant Examiner*—Paul J. Hirsch
*Attorney, Agent, or Firm*—Owen, Wickersham & Erickson

[57] ABSTRACT

A fish grader having a boxlike frame with at least one barred side with a net attached outside the frame. The grader is placed in water and fish to be sorted are put in it. The smaller fish swim through the bars into the net, leaving the larger fish in the grader box, from which they can be released into a rearing enclosure.

4 Claims, 5 Drawing Figures

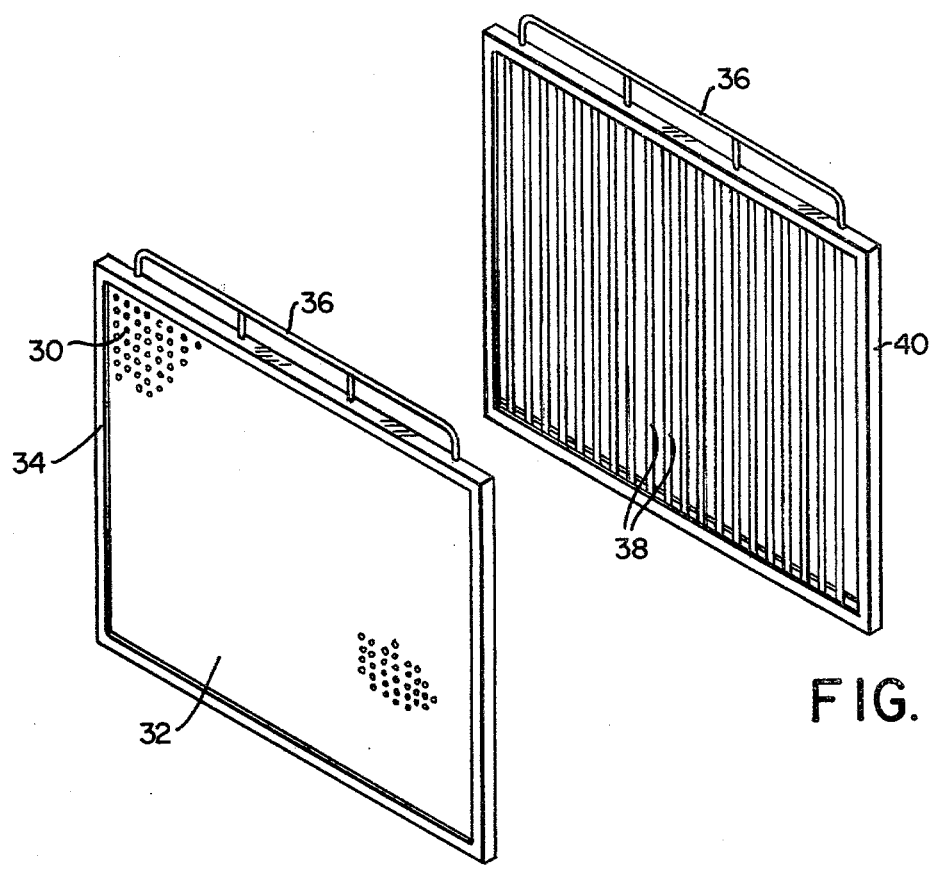
FIG. 3
FIG. 2
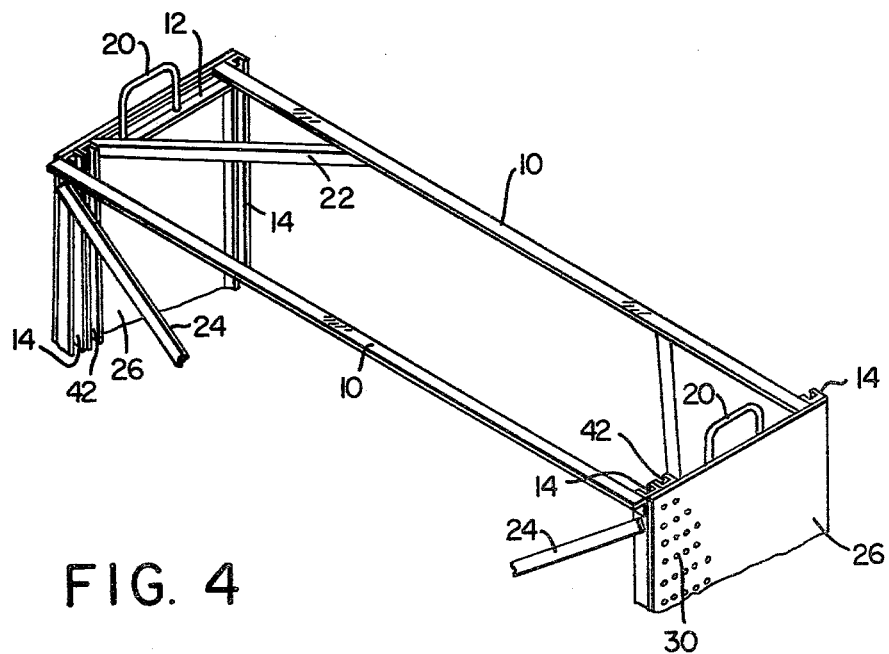
FIG. 4

GRADING SMALL LIVE FISH UNDERWATER

This invention relates to fish graders. More particularly it relates to a fish sorting cage which can be used to cull out undersized fish.

Fish from the same spawning and reared under identical conditions grow at different rates. This has been found to be particularly true with the family salmonidae. Costs for feed, labor and material are such that it is not economically practical to rear the fish who fall into the lower range of growth rate. Accordingly, it is advantageous to cull out and eliminate the slower growing, uneconomical fish as early as possible in the rearing cycle. The smaller the size of the culls, the less the cost expended in them. It would be quite desirable to be able to maintain a cutoff point for culls down to two grams in weight. The exact percentage of culls will vary according to the species of fish, particular strains of species, and many local rearing and environmental factors.

Culling out fish less than ten grams in size has been a particular problem because no currently available commercial grader is fully satisfactory for such work. Standard "box" graders will grade fish of the right size, but handle only small batches of fish and require constant attention. Furthermore, the larger fish retained in the "box" grader must generally be lifted out of the water again after grading, which imposes additional stress. Nielson type, divergent bar graders handle fish at a high rate of through put, but are imprecise with small fish and impose considerable stress as the grader operates entirely above the water. Fixed underwater bar graders are cumbersome to operate and cannot easily be moved.

It is an object of the present invention to provide a fish grader which will exert minimal physical and psychological stress on all fish retained in the grader. A further object is to provide a fish grader which is precise in the separation of different sizes of fish yet readily adjustable as to the size of fish being separated. Another object is to provide a fish grader with a high rate of through put of fish per unit time. Yet another object is to provide a fish grader which is portable yet reasonable in cost and efficient to operate and maintain. Still another object is to separate fish with minimal stress on the larger fish being separated.

The present invention includes a box-like frame with a width considerably less than its length and height. The bottom and ends are panels which can be solid or can have perforations which permit water flow but are too small for any fish to pass through. The two opposing sides have grooves around their circumference to permit removeable side panels to be placed in the grooves. One of the panels is normally impervious to fish and the other is barred, with the bar spacing set to pass the desired size of fish. A large net is attached outside the barred side panel to contain fish that pass through the bars.

In the Drawing:

FIG. 2 is an isometric view of a perforated side panel which is impervious to the passage of fish.

FIG. 3 is an isometric view of a barred side panel.

FIG. 4 is a partial isometric view of a fish cage frame with double grooves on one side to accommodate two panels.

Figure 1:
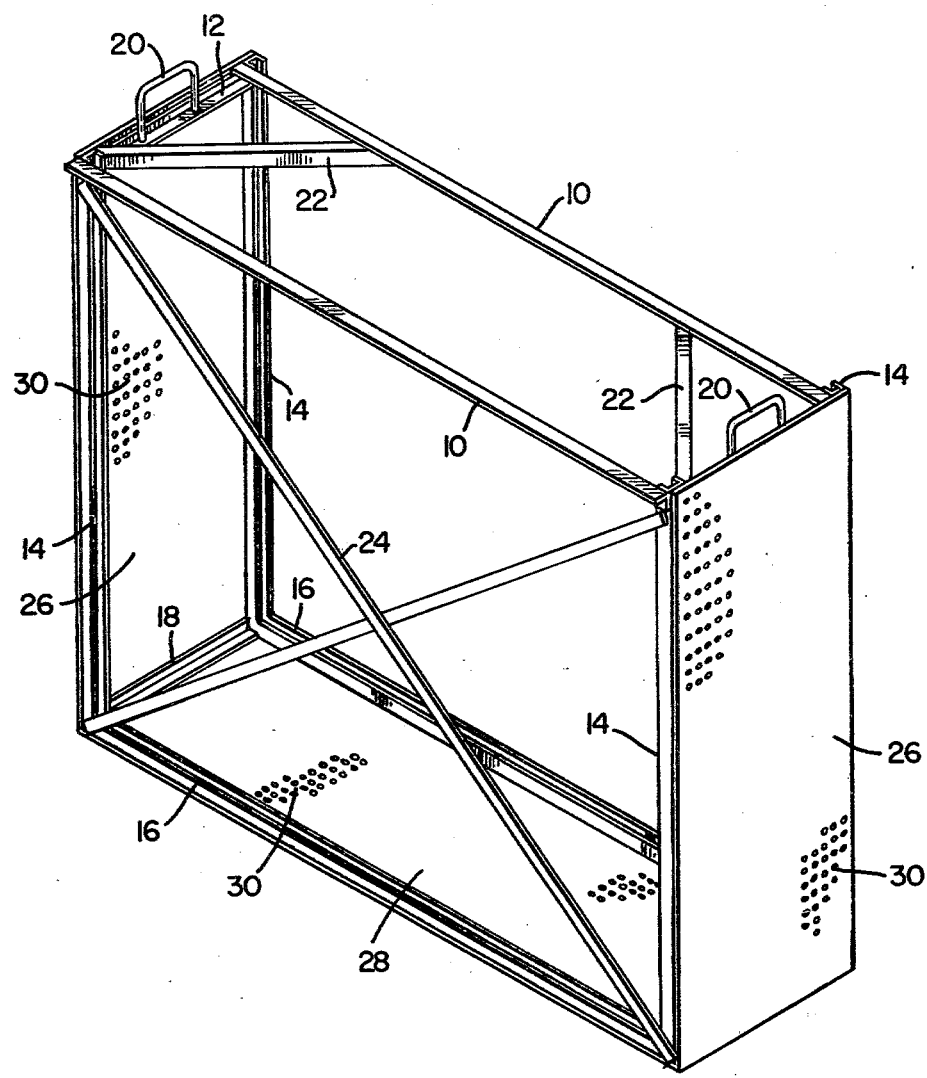
FIG. 1 is an isometric view of a fish cage frame with no panels in plce.

In FIG. 1 can be seen the construction of the fish cage frame with side bars 10, upper end bars 12, side channels 14, bottom channels 16 and bottom end bars 18. Lift handles 20 are attached to the upper end bars 12 and top braces 22 and side braces 24 make the frame rigid. End panels 26 and bottom panel 28 have perforations 30. FIG. 2 shows a solid side panel 32 with perforations 30 held in a solid panel frame 34 with lift bars 36 on top. FIG. 3 shows a barred side panel with grader bars 38 set a predetermined uniform distance apart in a barred panel frame 40 with lift bars 36 on top. FIG. 4 shows an embodiment of the invention wherein on one side of the frame there is a second side channel 42 immediately adjacent to the side channel 14. This channel continues around the perimeter of the frame with a second bottom channel, not shown, next to the bottom channel 16.

Figure 5:
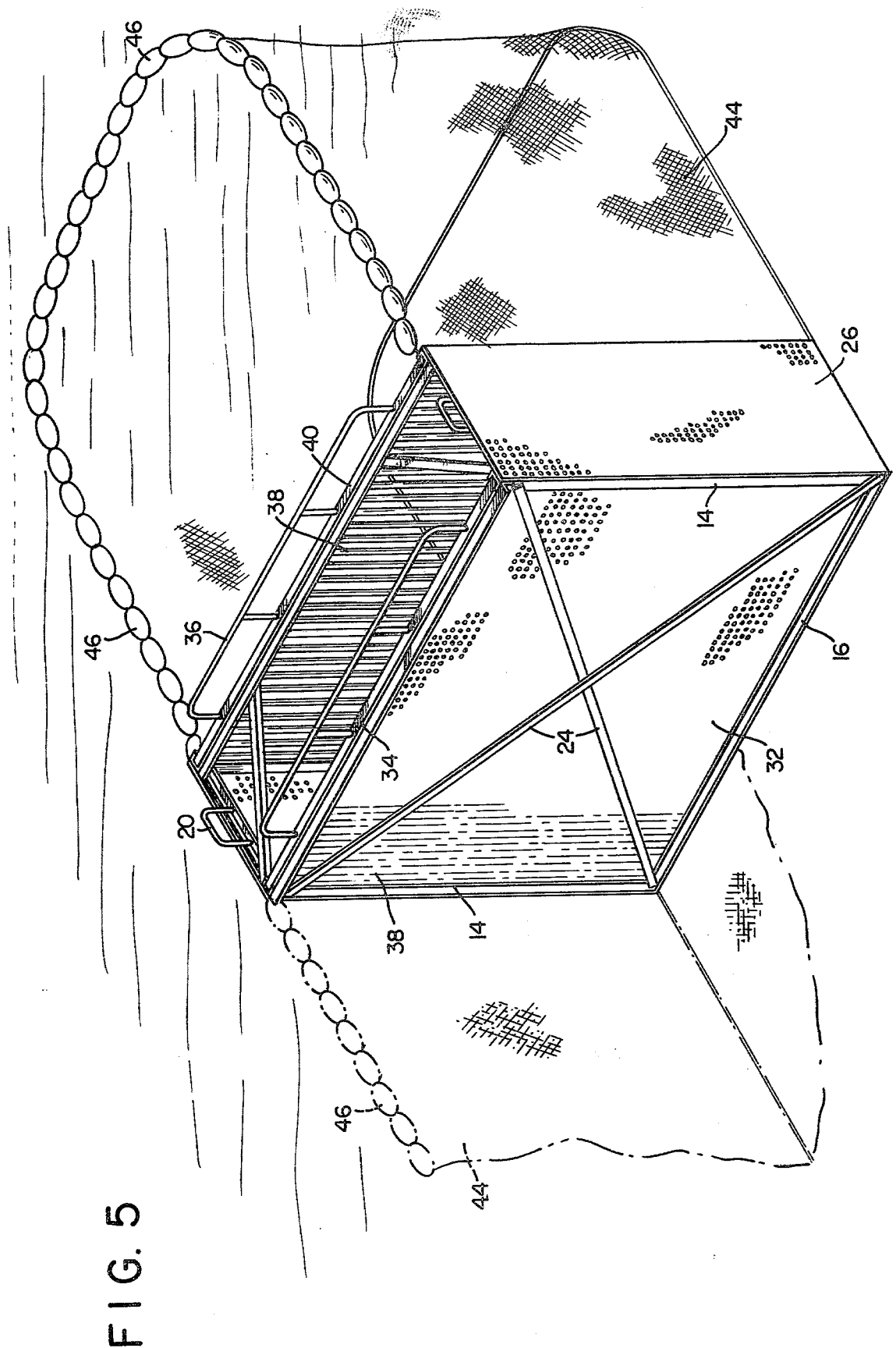
FIG. 5 is an isometric view of a fish sorting cage according to the invention, in water with a net attached.

In FIG. 5 is shown a complete fish cage assembly in the water with a solid side panel 32 in place on one side of the frame and a panel of grader bars 38 in place on the other side of the frame. Shown attached to the barred panel side of the frame is a net bag 44 supported by floats 46. Shown with dotted lines is a second net bag 44 also supported by floats 46 which if desired can be attached to a barred panel frame 40 which has been substituted for the solid side panel 32.

In a preferred embodiment of the invention the frame is put in the water as in FIG. 5, with the top edges of the frame sufficiently above the water's surface to prevent any fish from jumping in or out of this boxlike enclosure. Similarly the floats 46 keep the edge of the net bag 44 high enough to discourage jumping. In this embodiment one solid side panel 32 is used with a net bag 44 attached to a barred panel frame 40 on the opposite side of the frame. The barred panel is selected to have the grader bars 38 spaced at a distance from one another such as to permit only fish below the desired size to pass through. The fish to be graded are then introduced into the interior of the grader frame by pumping, flowing, dip netting or other means. The density of the fish is increased until the fish have a strong desire to escape through the grader bars 38. Small fish below the selected cutoff size will swim through the grader bars 38 into the net bag 44 while the larger fish will remain with the box formed by the fish grader frame with the side panels in place. Since the volume of the net bag 44 is much larger than the volume of the grader box and the total weight of the culled fish in the net bag 44 is generally much less than the total weight of the retained fish in the grader box, there is little incentive for the culled fish to swim back through the grader bars 38 into the grader box.

When grading of the fish has reached a satisfactory end point and fish density of the larger fish in the box approaches maximum, the solid side panel 32 is raised sufficiently high in its grooves 14 to permit the retained larger fish to swim out into the main rearing enclosure inside which the grader is positioned. The culls or smaller fish in the net bag 44 are left there and need not be removed from the water. After the larger fish have swum out of the box into the main rearing enclosure, which ordinarily occurs in less than a minute, the solid side panel 32 is dropped back into place and a new batch of fish is placed inside the grader frame or box and the process is repeated. When the density of the culls or smaller fish in the net bag 44 becomes excessive, the barred panel frame 40, with the net bag 44 attached, is lifted above water. The net bag 44 is then pursed and the culls are removed.

As shown in the dotted line embodiment in FIG. 5 a second barred panel frame 40 with grader bars 38 and net bag 44 attached can be used on the other side of the grader frame instead of solid panel frame 34 with solid panel 32. With this arrangement more culls or smaller fish can be collected before pursing the net bags 44 and removing them. If desired a dual channel arrangement as shown in FIG. 4 can be used on one or both sides of the grader frame. This permits greater flexibility in using the grader. If for example, it is desired to hold the larger fish inside the grader frame or box while the culls are removed in the pursed net bag, this can be done by putting a solid panel frame 34 with solid side panel 32, in the second set of grooves 42 before raising the barred panel frame 40 and attached net. Other manipulation of panel combinations will be apparent to one concerned with grading and separating fish.

The solid side panel 32 is not necessarily totally solid but may have perforations 30 as shown or other openings for water permeability and consequent ease of handling. The important thing is that the opening be too small to permit any fish to pass through. The spacing of the grader bars 38 in the barred panel frame will be according to the size of the fish to be retained. It has been found that fish as small as two grams in weight can be retained. For this size salmon or trout fingerling a bar spacing of about 0.5 centimeters is effective. The larger spacing to retain a larger size of fish can readily be determined by one skilled in the art.

Use of the grader of the invention allows fish to grade themselves under water with minimal stress. When used in the manner described above so that the retained larger fish are released into the rearing enclosure it permits their release after grading without netting, dipping or lifting out of water. While described principally as a tool for culling out unwanted smaller fish to be discarded the grader of the invention is also useful for separating two sizes of fish when both are to be retained.

What is claimed is:

1. A fish sorting cage comprising a rectangular frame having a closed bottom, closed ends, two open opposing sides, and a removable side panel for each said side, with grooves on the edges of said two opposing sides adapted to receive removable panels, at least one of said side panels comprising a plurality of parallel bars of predetermined spacing and having a net affixed to the edges of said barred panel.

2. A fish sorting cage according to claim 1 wherein one of said side panels is impenetrable to fish and other comprises said plurality of parallel bars.

3. A fish sorting cage according to claim 1 wherein each of said side panels comprises said plurality of parallel bars and each said side panel has a net affixed to the edges of its said barred panels.

4. A fish sorting cage according to claim 1 having a second set of grooves on the edges of at least one of said two opposing sides, and thus capable of receiving a second removable panel in said second set of grooves.

* * * * *